P. P. STOKER
RAILWAY TRAFFIC CONTROLLING APPARATUS
Nov. 24, 1931.
Re. 18,265
Original Filed April 17, 1928
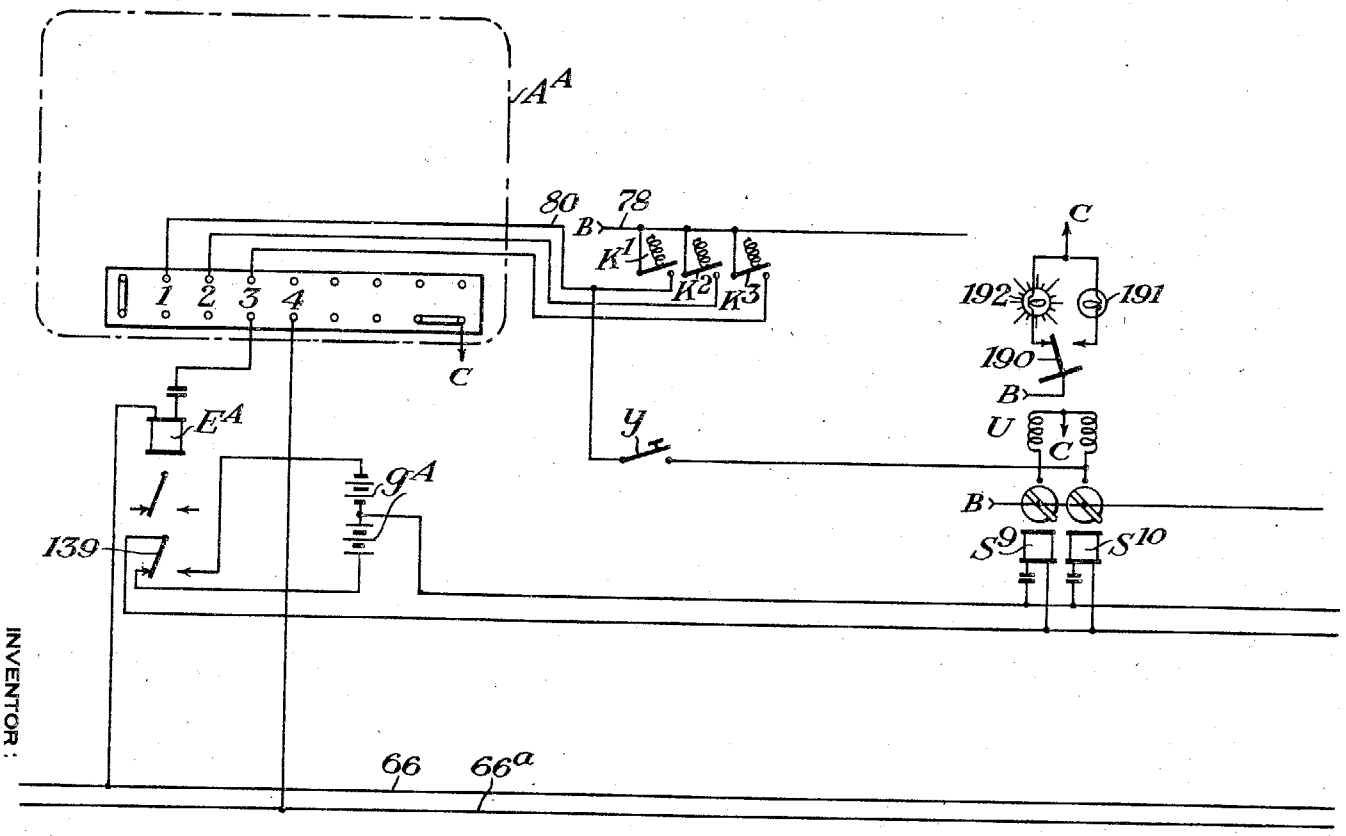
INVENTOR:
Paul P. Stoker,
by A. R. Vencill
His Attorney Reissued Nov. 24, 1931 Re. 18,265

UNITED STATES PATENT OFFICE

PAUL P. STOKER, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY TRAFFIC CONTROLLING APPARATUS

Original No. 1,727,183, dated September 3, 1929, Serial No. 270,619, filed April 17, 1928. Application for reissue filed August 26, 1931. Serial No. 559,567.

My invention relates to railway traffic controlling apparatus, and particularly to apparatus of the type comprising a coding device located at a central station, such as a despatcher's office, for delivering control codes to a pair of line wires for the control of governing devices located at points remote from the despatcher's office, and which devices, in turn control the supply of indication codes to said line wires for the actuation of indication means in the despatcher's office.

One system of apparatus operating in the manner described is disclosed and claimed in an application for Letters Patent of the United States, Serial No. 254,684, filed February 16, 1928, by Clarence S. Snavely, for railway traffic controlling apparatus, and my present invention relates to an improvement on a portion of the apparatus disclosed in said application.

I will describe one form of apparatus embodying my invention, and will then point out the novel features thereof in claims.

The accompanying drawing is a diagrammatic view showing one form of railway traffic controlling apparatus embodying my invention.

Referring to the drawing, the reference character $A^A$ designates a coding device located at a train despatcher's office and arranged at times to supply control codes to a pair of line wires 66 and $66^a$ for the control of traffic governing devices located at points remote from the despatcher's office and not shown in the drawing. The coding device $A^A$ is controlled in part by three manually operable keys $K^1$, $K^2$ and $K^3$, arranged when operated to connect terminal B of a source of energy not shown in the drawing with terminals 1, 2 or 3, respectively, of the coding device.

The details of the coding device $A^A$ are omitted from the drawing for the sake of simplicity, but these details are completely disclosed in the Snavely application identified above, it being sufficient for present purposes to state that when key $K^2$ is operated, the coding device delivers to line wires 66 and $66^a$, a control code which clears certain signals at a remote point; when key $K^3$ is operated certain other signals at said point are cleared; and when key $K^1$ is operated all signals at said point are restored to the stop position.

Located also at the despatcher's office are two selectors $S^9$ and $S^{10}$, each comprising a contact which is closed for a brief interval when the winding of the selector is supplied with a predetermined indication code. The selectors $S^9$ and $S^{10}$ are supplied with energy from a battery $g^A$ under the control of contact 139 of a relay $E^A$ which faithfully follows the impulses of indication codes supplied to the line wires.

The selectors $S^9$ and $S^{10}$ are responsive to the condition of the track circuit associated with the signals governed by keys $K^1$, $K^2$ and $K^3$, selector $S^{10}$ being operated to close its contact when a train enters this section, and selector $S^9$ being operated to close its contact when the train leaves the track section, as described in the Snavely application referred to hereinbefore. When selector $S^9$ is operated, current is supplied to the left-hand winding of a relay U from terminals B and C to move armature 190 to a left-hand position in which it is illustrated in the drawing. When the armature occupies this position, lamp 192 is lighted to indicate to the despatcher that the section through which traffic is governed by the signals controlled by keys $K^1$, $K^2$ and $K^3$ is unoccupied. When selector $S^{10}$ is operated, however, current is supplied to the right-hand winding of relay U, armature 190 is swung to the right, and lamp 191 is lighted to indicate that the section is occupied by a train.

In systems of the type here involved it is usual to control the signals associated with a section of track in such manner that when a train occupies the section all signals will indicate stop, but that when the train leaves the section, any signal or signals which were cleared before the train entered the section will return to the proceed position. This is usually called "semi-automatic" control. It is sometimes desirable, however, to introduce what is known as "stick" control of such signals. This is accomplished by arranging the signal control so that after a train enters and leaves a section, the signals will remain at stop until the despatcher takes suitable steps to again clear a signal.

In order to provide for stick control of the signals controlled by keys $K^1$, $K^2$ and $K^3$, in the apparatus here shown, I have provided a manually operable push button Y which is arranged when closed to connect the contact of selector $S^{10}$ in parallel with key $K^1$.

In explaining the operation of the apparatus, I will assume that push button Y is closed and that the despatcher has operated one of the keys $K^2$ or $K^3$ to clear a signal. If, now, a train enters the track section associated with such signal, an indication code will be delivered to the line wires 66 and $66^a$ which operates selector $S^{10}$. When the contact of this selector closes relay U is reversed, of course, but in addition, terminal B is connected through the contact of selector $S^{10}$, push button Y and wire 80, with terminal 1 of coding device $A^A$. As a result the device $A^A$ supplies to the line wires the control code which restores the signals to stop, and after the train leaves the section all signals remain in the stop position.

It will be seen, therefore, that by the use of apparatus embodying my invention, either semi-automatic control or stick control of the signals shown in the Snavely application may be obtained, and that these desirable results are accomplished with the addition of comparatively little apparatus in the despatcher's office only, and without affecting the operation of the remainder of the apparatus.

Although I have herein shown and described only one form of railway traffic controlling apparatus embodying my invention, it is understood that various changes and modifications may be made therein within the scope of the appended claims without departing from the spirit and scope of my invention.

Having thus described my invention, what I claim is:

1. In combination, a pair of line wires at times supplied with an indication code, a coding device for at times supplying a control code to said line wires, a manually operable key for controlling said coding device, a selector responsive to said indication code and comprisng a contact, and manually controlled means for at times connecting the contact of said selector in parallel with said key.

2. In combination with manually controlled apparatus for transmitting different control signals to a remote point, a relay at said remote point, means selectively responsive to one signal from said apparatus for operating said relay to one position and to another signal from said apparatus for moving said relay to a different position, a railway signal controlled by said relay, indication means associated with said apparatus and controlled in accordance with traffic conditions at such remote point, and manually controlled means for at times placing said apparatus under the control of said indication means.

3. In combination with a railway signal, a two-position relay for controlling said signal, manually controlled transmitting means at a remote point for transmitting one signal to momentarily operate the relay to one position and another signal to momentarily operate the relay to another position, indication means at said remote point, means for controlling said indication means in accordance with traffic conditions, and manually controlled means at such remote point for placing said transmitting means under the control of said indication means.

4. In combination with a railway signal, a two-position relay arranged to remain in either position until actuated to the other position, means controlled by said relay for governing said signal, transmitting means at a remote point for selectively actuating said relay to one position or the other, indication means at said remote point controlled by traffic conditions adjacent said signal, means for at times controlling said transmitting means by said indication means, and manually controlled means for at times removing said indication means from the control of said transmitting means.

5. In combination with a railway signal, a stick relay, means controlled by said stick relay for governing said signal, transmitting means at a remote point for selectively operating said relay, indication means at said remote point responsive to traffic conditions adjacent said signal, means for at times controlling said transmitting means by said indication means, and manually controlled means for at times removing said indication means from the control of said transmitting means.

6. In combination with a section of railway track, a signal for governing traffic over said section, a stick relay, means for controlling said signal to indicate proceed when the stick relay occupies one position and stop when the stick relay occupies another position, transmitting means at a remote point for momentarily selectively operating said stick relay to said one or said other positions, indication means at said remote point, means responsive to the entrance of a train into said section for actuating said indication means, and means effective when said indication means is energized to condition the transmitting means for operating the stick relay to said other position.

7. In combination with a section of railway track, a signal for governing traffic over said section, a stick relay, means for controlling said signal to indicate proceed when the stick relay occupies one position and stop when the stick relay occupies another position, transmitting means at a remote point for momentarily selectively operating said stick relay to said one or said other positions, indication means at said remote point, means responsive to the entrance of a train into said section for actuating said indication means, means effective when said indication means is energized to condition the transmitting means for operating the stick relay to said other position, and manually controlled means for at times preventing said control of the transmitting means by said indication means.

8. In combination with a section of railway track, a signal for governing traffic over said section, a stick relay, means for controlling said signal to indicate proceed when the stick relay occupies one position and stop when the stick relay occupies another position, transmitting means at a remote point for momentarily selectively operating said stick relay to said one or said other positions, indication means at said remote point, means responsive to the entrance of a train into said section for actuating said indication means, and means effective when said indication means is energized to automatically initiate operation of said transmitting means to operate the stick relay to said other position.

In testimony whereof I affix my signature.

PAUL P. STOKER.